United States Patent [19]

Waszkiewicz

[11] 4,395,660
[45] Jul. 26, 1983

[54] LAMP DIMMER CIRCUIT UTILIZING OPTO-ISOLATORS

[76] Inventor: E. Paul Waszkiewicz, 2826 Channel Dr., Ventura, Calif. 93003

[21] Appl. No.: 221,708

[22] Filed: Dec. 31, 1980

[51] Int. Cl.³ .......................................... H05B 37/02
[52] U.S. Cl. .................................. 315/291; 250/551; 315/199; 315/DIG. 4; 323/326; 323/902
[58] Field of Search ............... 315/156, 158, 194, 199, 315/291, 307, DIG. 4; 250/551, 552; 323/326, 349, 350, 902

[56] References Cited

U.S. PATENT DOCUMENTS 4,238,723 12/1980 Jenks ............................... 323/902 X
4,311,956 1/1982 Tolmie, Jr. ....................... 323/326 X Primary Examiner—Eugene La Roche
Attorney, Agent, or Firm—Frank L. Zugelter

[57] ABSTRACT

A solid-state dimmer control circuit using opto-isolators, whereby the effective power to be supplied to a load is selectively varied. The opto-isolators couple a variable pulse switching circuit to a full-wave switching circuit which includes back-to-back silicon-controlled rectifiers. The variable pulse switching circuit is connected to means for generating a selectively variable control signal that is proportional to the power to be supplied to the load. A single a.c. power source is provided both switching circuits.

24 Claims, 6 Drawing Figures

LAMP DIMMER CIRCUIT UTILIZING OPTO-ISOLATORS

TECHNICAL FIELD

This invention relates to a solid-state dimmer control for lamps, and more particularly to a silicon-controlled rectifier switching type load controller that is driven by a continuously variable pulse generator coupled thereto via opto-isolators. Moreover, a reference signal from the power controller is fed back to the pulse generator via an opto-isolator, to insure operational stability.

BACKGROUND OF PRIOR ART

Many types of circuits have been developed heretofore for the selective control of the light output of incandescent lamps. A particular type of circuit for this purpose comprises a silicon-controlled rectifier [SCR], the duty cycle of which is controlled by a voltage-controlled oscillator [VCO]. The lamp to be controlled is series connected in the anode circuit of the SCR, and the gate electrode is cyclically switched on by the VCO. Either the frequency [pulse repetition rate] or the pulse width of the control signal from the VCO is used to selectively and proportionately control the conduction period of the SCR or triac, and hence the amount of power supply to the load. Certain of these circuits are half-wave designs and others are full-wave. In the latter instance either a pair of SCR's are used or a triac may be used. Circuits of this general type are disclosed in U.S. Pat. Nos.: 3,868,546; 3,816,797; 4,016,451; and 4,095,139.

Other types of dimmer circuits having gated semiconductor switching devices, use a phase shifting circuit to selectively control the phase of the alternating current supply voltage applied to the gate control of the power semiconductor device. This general type of circuit is disclosed in U.S. Pat. Nos.: 3,401,265 and 4,096,414.

Other types of condition-responsive impedance devices are used to affect the gate control of semiconductor power switching elements, in prior art lamp dimmers shown in U.S. Pat. Nos.: 3,344,310; 3,800,185; and 4,159,442.

The use of optical couplers, or similar photoelectric elements for gating semiconductor power switching devices, in lamp dimming circuits, are disclosed in U.S. Pat. Nos.: 3,256,463; 3,996,475; and 4,090,107. In certain of these devices, the use of photocouplers eliminates the need for a transformer to provide for electrical isolation between the higher voltage AC power supplied to the lamp load, and the lower voltage selectively variable control signal.

Also, the use of various means have been proposed heretofore to stabilize the selected intensity of the light from the lamp load, notwithstanding variations in the power supply voltage.

All of the foregoing circuits and devices have met with varying degrees of success. The most satisfactory of these have been those intended for a specific narrow application, rather than a degree of independence or flexibility as to end use.

SUMMARY OF THE INVENTION

The present invention comprises a full-wave lighting dimmer employing silicon-controlled-rectifiers the gating of which is controlled by selectively variable pulse signals supplied via a pair of opto-isolators. Zener diode voltage stabilization is employed to inhibit the effects of undesired variations in the supply voltage. The selectively variable input control signal comprises a direct-current voltage which controls the generation of a ramp or saw-tooth control waveform, which in turn controls the switching cycle of the SCR's. The phase stability of the overall circuit is enhanced by coupling a signal corresponding to the beginning of every half-cycle of the AC supply voltage, from the variable pulse control circuit to the power switching circuit via an opto-isolator. Thus, the overall circuit employs three opto-isolators which provide complete electrical isolation between the input control circuit and the load power circuit.

It is therefore an object of the invention to provide a novel and improved lamp dimmer for efficiently controlling relatively high power levels and for totally isolating the pulse generating circuit, electrically, from the power switching circuit.

Another object of the invention is to provide a novel and improved dimmer having better stability and immunity to line voltage variations than prior circuits intended to provide a generally similar dimming function.

Other features, objects and advantages of the invention will become apparent from the following specification, appended claims thereto, and the accompanying drawing taken in connection therewith.

DESCRIPTION OF THE PREFERRED EMBODIMENT

Figure 1:
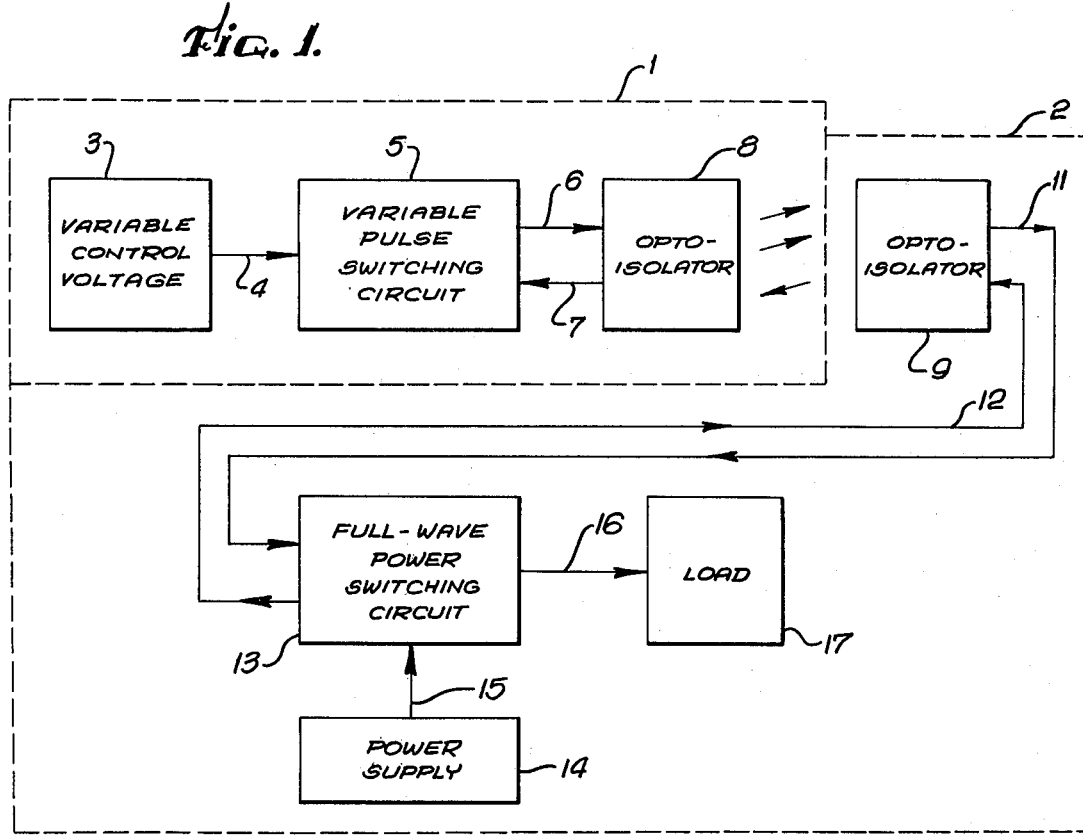
FIG. 1 is a block diagram illustrating the basic relationship of the elements, including the variable pulse switching circuit, the full-wave power switching circuit, and the opto-isolators.

There is shown in FIG. 1 a block diagram of the functional components of the invention, and which comprises a variable pulse switching circuit 1 and a full-wave power switching circuit 2. Circuit 1 comprises a variable control voltage source 3 for providing a selectively variable direct-current [DC] voltage on line 4, the amplitude of which is directly proportional to the desired output power supplied to the load circuit of the device. A variable pulse switching circuit 5 is responsive to the voltage level on line 4 to provide a square wave pulse train on line 6, the pulse repetition rate of which is directly proportional to the input voltage 4. The pulses on line 6 energize a light emitting diode [LED] in the group of opto-isolators identified by the numeral 8.

A phototransistor in the group of opto-isolators identified by the numeral 9 is changed to its conductive state upon being illuminated by the corresponding LED in opto-isolators 8. Phototransitor 9 in turn produces a control pulse in line 11 which swiches a corresponding SCR in power switching circuit 13 into conduction. Power supply 14 energizes the now-conducting circuit 13 so that the power supply-potential 14 appears on line 16.

Load 17, for example, may be a relatively high-wattage incandescent lamp or bank of lamps.

A reference signal for stabilizing the operation of the system against undesirable fluctuations in the available power supply voltage 14 is sent from circuit 13 via line 12 to opto-isolators 9 and 8. This in turn sends the reference control signal via line 7 to the variable pulse switching circuit 5. A more detailed explanation of the functioning of these circuits will follow, in connection with a description of the operation of the circuits shown in FIGS. 2-3.

Figure 2:
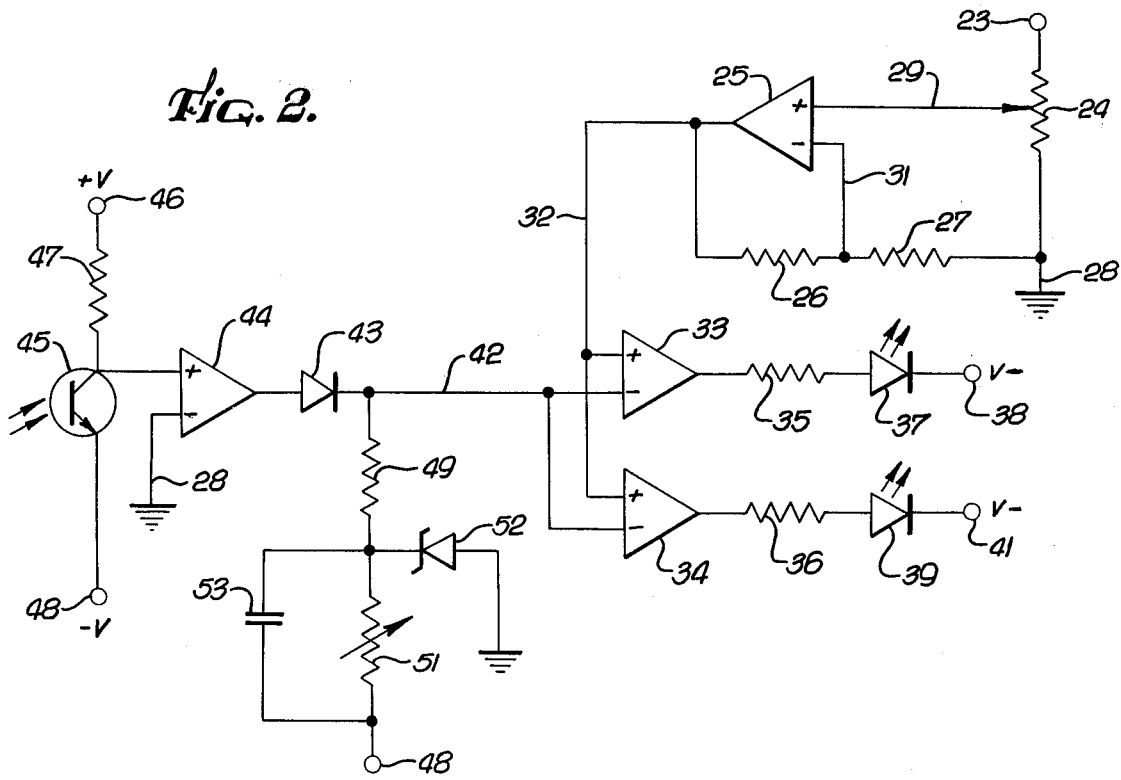
FIG. 2 is a schematic circuit diagram of the variable pulse switching circuit portion of the invention.

Referring to FIG. 2, there is shown the variable pulse switching circuit identified as 5 in FIG. 1. A selectively variable DC control voltage of 0 to 1 voltage in range is to be supplied to terminal 23 so as to appear across gain control 24, which is referenced to ground 28. The control signal at terminal 23 may be obtained from any suitable and well-known source, such as a fixed DC source and potentiometer as will be obvious to one skilled in the art.

The gain adjusted control signal is supplied to the positive input of voltage-doubling amplifier 25 via line 29. The negative input of amplifier 25 is provided with a feedback signal on line 31 derived from the network comprising feedback resistor 26 and resistor 27 which is referenced to ground 28.

The amplified control signal appears on line 32 and is supplied to positive inputs of a pair of operational amplifiers 33 and 34. The outputs from amplifiers 33, 34 are supplied via resistors 35 and 36, respectively, to respective light-emitting diode [LED] portions of a pair of opto-isolators. LED's 37 and 39 are respectively referenced to negative supply voltage at terminals 38 and 41. It may be noted here that the potential at 48, described below, is at the same value as that at terminals 38 and 41.

The alternate (viz., negative) inputs of operational amplifiers 33 and 34 are connected together and supplied with an adjusted reference signal that appears on line 42. This reference signal comprises a saw-tooth waveform [FIG. 5], the generation of which will be described later.

Line 42 is connected to the cathode of diode 43, the anode of which is connected to the output of operational amplifier 44. The negative input of amplifier 44 is referenced to ground 28 and the positive input is derived from the collector of phototransistor 45. The collector of element 45 is also connected to a positive power supply voltage at terminal 46 via resistor 47. The emitter of phototransistor 45 is returned to a negative supply voltage at terminal 48.

A Zener-diode stabilized reference voltage is supplied to line 42, from a circuit comprising fixed resistor 49 and adjustable resistor 51 which in turn is connected to the negative voltage supply terminal 48. Resistor 51 is shunted with capacitor 53 and the junction between voltages dividing resistors 49 and 51 is connected to the cathode of Zener diode 52. The anode of Zener diode 52 is connected to ground 28.

Amplifiers 33 and 34 are used in a comparative mode in which the input control signal from terminal 23 is differentially compared with the saw-tooth waveform from amplifier 44. This function will be described more fully in connection with the analysis of the waveforms in FIGS. 4, 5, and 6.

Figure 3:
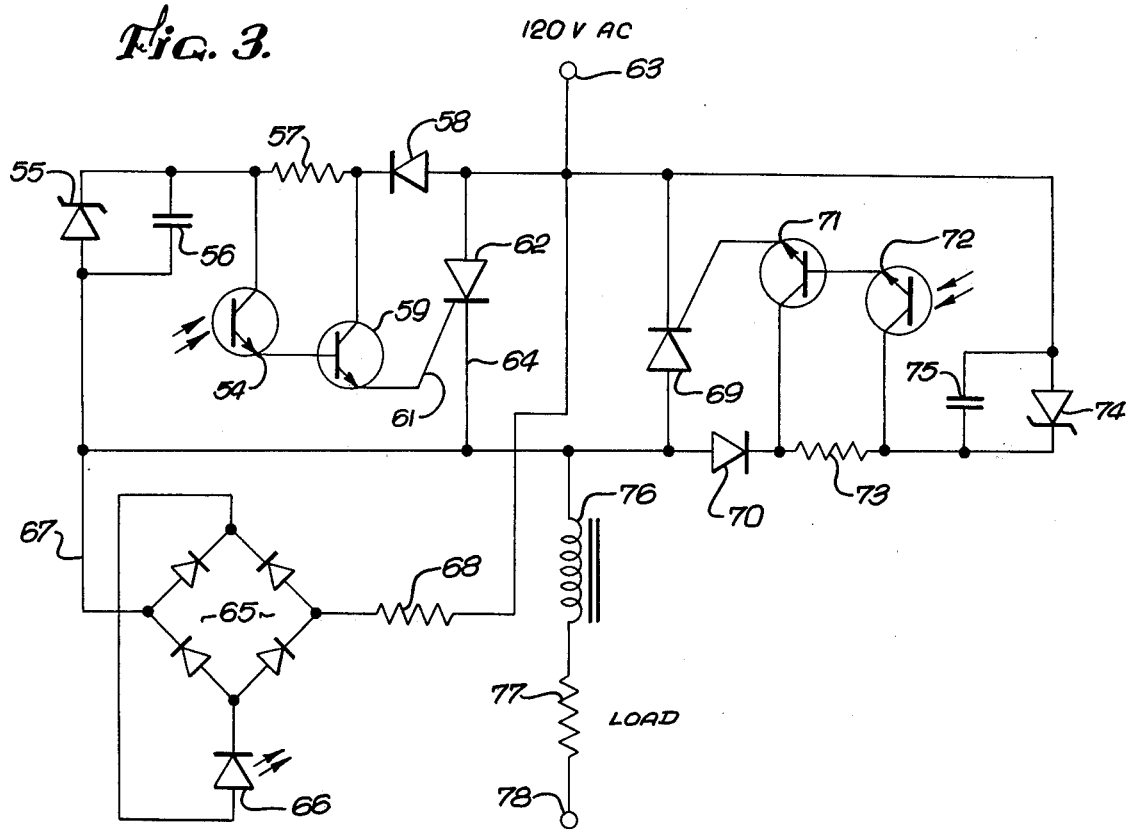
FIG. 3 is a schematic circuit diagram of the full-wave power switching portion of the invention.

Referring now to the full-wave power switching circuit of FIG. 3, there is shown a first phototransistor 54, which is optically coupled to LED 37 [shown in FIG. 2]. Zener diode 55 is shunted by capacitor 56 and has its cathode connected to one end of a current limiting resistor 57. The other end of resistor 57 is connected to the junction between the cathode of blocking diode 58 and the collector of amplifier transistor 59. The base of transistor 59 is connected to the emitter of phototransistor 54. The emitter of transistor 59 is connected to the gate electrode 61 of a first silicon-controlled rectifier [SCR] 62. The cathode of the SCR 62 is connected to line 64 and the anode is connected to the high side terminal 63 of the alternating current [AC] supply.

A full-wave bridge rectifier 65 has its DC output connected to LED 66, which in turn is optically coupled to phototransitor 45 [shown in FIG. 2]. The AC input to rectifier 65 is supplied via line 67 and through series current-limiting resistor 68 connected to AC terminal 63.

A second SCR 69 has its anode/cathode connections inverted with respect to those of the first SCR 62. As can be seen, the anode of SCR 69 is connected to line 64 and its cathode is connected to AC terminal 63. The gate electrode of SCR 69 is connected to the emitter of an amplifying transistor 71, the collector of which is connected to the junction between the cathode of a blocking diode 70 and one end of resistor 73. The base of transistor 71 is connected to the emitter of phototransistor 72. Phototransistor 72 is optically coupled to LED 39 [shown in FIG. 2]. A fixed DC reference voltage is applied to the emitter of phototransistor 72 from the circuit comprising Zener diode 74 and shunt capacitor 75.

The load 77 of the power switching circuit 13 is connected between the common side of the AC power supply, at terminal 78, and line 64 via series choke 76.

As can be seen, the back-to-back arrangement of SCR's 62 and 69 will permit full-wave AC power to be supplied to load 77, assuming that they are properly gated into cyclical conduction. It will also be seen that the gating of SCR's 62 and 69 is under the control of the opto-isolators comprising the phototransistors 54 and 72, and the LED's 37 and 39, respectively.

Briefly stated, the comparing circuit of FIG. 2 compares the instantaneous amplitude of the DC control voltage at terminal 23 with the instantaneous amplitude of the saw-tooth reference signal on line 42. If the saw-tooth voltage is less than the reference voltage, initiating signals occur, and the LED's 37 and 39 will be turned on and the SCR's 62 and 69 will be triggered into conduction so as to supply alternating current to the load 77. On the other hand, if the then-existing saw-tooth amplitude is at or above the reference voltage, initiating signals do not occur, and such LED's will not be turned on, and such SCR's will not conduct.

It will be apparent that the period of conduction, or duty cycle, of the SCR's, can be continuously varied as determined by the point on the ramp portion of the saw-tooth waveform that the input control signal first matches the ramp amplitude.

Figure 4:
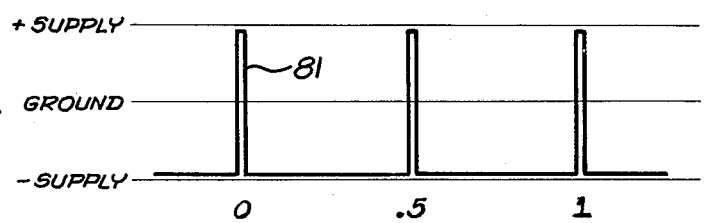
FIG. 4 is a diagram illustrating the spike reference signal generated in the circuit of FIG. 2.
Figure 5:
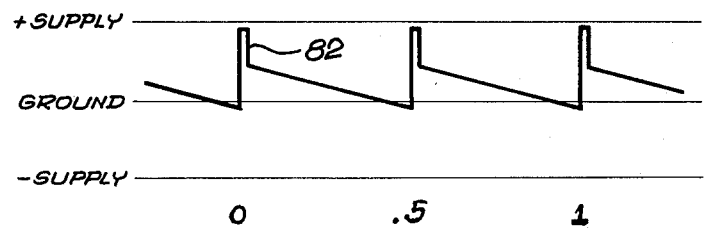
FIG. 5 is a diagram of another reference signal generated at the output of a network in the circuit of FIG. 2.
Figure 6:
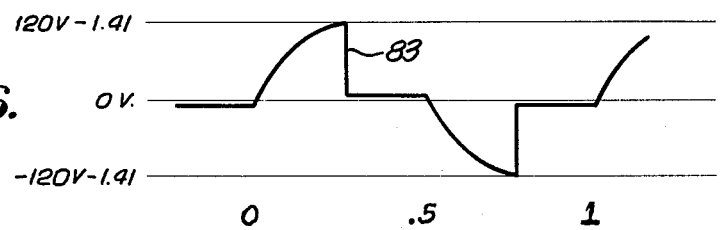
FIG. 6 is a diagram illustrating the waveform used in the circuit of FIG. 3 to trigger the silicon-controlled rectifiers in the invention.

This overall operation will be seen more clearly in connection with the following description of the waveforms shown in FIGS. 4, 5, and 6.

The two points used in the power circuit as a voltage reference are the anodes of each SCR 62 and 69. From the anode of SCR 62 the reference voltage is applied via resistor 68 to the input side of bridge rectifier 65. The rectified output of bridge rectifier 65 energizes LED 66. This results in phototransistor 45 being brought into conduction whenever the absolute value of the potential difference between the anode of SCR 62 and the anode of SCR 69 is less than a given fixed voltage, which in a practical embodiment is approximately 3 volts. Non-conduction of phototransistor 45 will result in the generation of a positive spike [indicated at 81 in FIG. 4] at the beginning of each half cycle with respect to the SCR's 62 and 69. Since phototransistor 45 is connected between positive supply 46 and negative supply 48, the spike pulse 81 passes through 0 [zero] volts.

Signal 81 is sent through buffer amplifier 44 and blocking diode 43 to the junction between a fixed reference voltage network [48–49 and 51–53] and the common [negative] inputs of comparator amplifiers 33 and 34. Resistor 51 is set so that the fixed reference voltage at line 42 is slightly negative with respect to ground 28. The output of the network at line 42 will be a saw-tooth waveform as indicated at 82 in FIG. 5.

The saw-tooth signal 82 applied to the negative inputs of operational amplifiers 33 and 34 is compared with the input control voltage on line 32 [as derived from the input at terminal 23]. The output from amplifiers 33 or 34 will be negative until the instantaneous level of saw-tooth 82 becomes more negative than the control voltage on line 32. When the point of coincidence of these two voltages [at 32 and 42] is passed, the outputs of amplifiers 33 and 34 will go positive and turn on the LED's 37 and 39.

The resistor 51 should be set so that the saw-tooth waveform of FIG. 5 is slightly negative just before the beginning of each half-cycle. Resistor 51 determines the slope of the ramp on the signal 82, and Zener 52 determines the top of the ramp on such signal.

When phototransistors 37 and 39 are turned on, current will flow into the bases of transistors 59 and 71, respectively. This in turn will cause the gates of SCR's 62 and 69, respectively, to turn on their respective SCR's. Of course, only one SCR of the pair will be turned on at a time, depending upon which half of the AC cycle was then extant. For example, if the anode of SCR 62 were more positive than its cathode, then blocking diode 58 would be forward biased which would then energize the circuit comprising components 54–59, making possible the flow of current to the gate of SCR 62. At this same time, SCR 69 and the blocking diode 70 would be reversed biased and the network comprising components 70–75 would not be energized and the gate of SCR 62 would not be turned on. The SCR's are turned off when the applied AC voltage amplitude goes to zero during each alternating current cycle.

Capacitors 56 and 75 serve to slow the voltage buildup across their respective Zener diodes 55 and 74. The purpose of these Zener diodes 55 and 74 is to limit the voltage applied to phototransistors 54 and 72 to be within their working limits.

The duration of the half-wave conduction cycle of each SCR lasts for as long as the amplitude of the saw-tooth waveform 82 is equal to or exceeded by the amplitude of the input control signal at 23. In a practical circuit, the desired range of output power applied across the load 77 is between 5% and 95% of that available from the AC supply [63 and 78]. The voltage appearing across the SCR's 62 and 69 at a 50% setting of the control voltage at terminal 23 is shown at 83 in FIG. 6. The load 77 is placed in series with choke 76 in order to suppress unwanted radio frequency interference signal caused by the switching action of the SCR's.

The power handling capacity of the circuit is determined principally by the rating of the SCR's and series choke 76.

From the foregoing it will be seen that the invention provides a novel and improved power control circuit, especially suitable for lamp dimming use, and which provides total electrical isolation between the selectively variable control circuit and the power circuit energizing the load. While the circuit comprising the invention is especially suitable for use with electrical lamps such as that employed in studio lighting, it will be apparent to those skilled in the art that it could equally be used with any electrical load that is capable of being controlled by silicon-controlled-rectifiers.

While there has been described above the principles of this invention in connection with the specific circuit, it is to be understood that this description is made only by way of example, and that the invention is limited only by the spirit and scope of the appended claims.

What I patently claim is:

1. An electrical load control circuit for selectively varying the effective power to be supplied to a load, comprising means for generating a selectively variable control signal proportional to the power to be supplied to the load, means responsive to said control signal generating means and to the occurrence of initiating signals for producing cyclical light output pulses, means optically coupled to said light pulse producing means and adapted for electrical connection to a power source, and responsive to such pulses, for switching power from such power source to the electrical load, and means responsive to said power switching means for generating such initiating signals.

2. The circuit of claim 1 including means for connecting a load in series between said full-wave power switching circuit means and such power source.

3. The load control circuit defined in claim 1 or claim 2 wherein the control signal generated by said control signal generating means comprises a direct current having a selected voltage amplitude.

4. The load control circuit defined in claim 1 or claim 2 wherein said light output pulse producing means comprises a voltage comparator for generating one of such output pulses whenever the amplitude of such control signal equals or exceeds the amplitude of a corresponding initiating signal.

5. The load control circuit defined in claim 4 including a light emitting diode energized by said voltage comparator.

6. The load control circuit defined in claim 1 or claim 2 wherein said power switching means includes a pair of silicon-controlled-rectifiers each having an anode and a cathode and each adapted to be in series between the alternating-current power source and the electrical load, each of said rectifiers having a gate electrode controlled by said means responsive to such pulses.

7. The load control circuit defined in claim 6 wherein said means for generating initiating signals comprises a fixed reference voltage means and a light emitting diode that is energized whenever the potential at an anode of one of said rectifiers is greater than the potential of the anode of the other of said rectifiers, and a phototransistor optically coupled to said light output pulse producing means.

8. The load controlled circuit defined in claim 1 or claim 2 wherein said means responsive to such pulses comprises a phototransistor optically coupled to said light output pulse producing means.

9. The circuit of claim 1 or claim 2 including an alternating-current power source and an electrical load.

10. The load control circuit defined in claim 9 wherein said power switching means includes a pair of silicon-controlled-rectifiers each having an anode and a cathode, each of said rectifiers in series between said alternating-current power source and said electrical load, each of said rectifiers having a gate electrode controlled by said means responsive to such pulses.

11. The load control circuit defined in claim 10 wherein said means for generating initiating signals comprises a fixed reference voltage means and a light emitting diode that is energized whenever the potential at an anode of one of said rectifiers is greater than the potential of the anode of the other of said rectifiers, and a phototransistor optically coupled to said light output pulse producing means.

12. The load control circuit defined in claim 9 wherein said means responsive to such pulses comprises a phototransistor optically coupled to said light output pulse producing means.

13. The load control circuit defined in claim 9 wherein the control signal generated by said control signal generating means comprises a direct current having a selected voltage amplitude.

14. The load control circuit defined in claim 9 wherein said light output pulse producing means comprises a voltage comparator for generating one of such output pulses whenever the amplitude of such control signal equals or exceeds the amplitude of a corresponding initiating signal.

15. The load control circuit defined in claim 9 including a light emitting diode energized by said voltage comparator.

16. In a load control circuit for selectively varying the effective power to be supplied to a load, the improvement comprising means for generating a selectively variable control signal proportional to the power to be supplied to the load, means responsive to said control signal generating means and to the occurrence of initiating signals for producing cyclical light output pulses, means optically coupled to said light pulse producing means, and responsive to such pulses, for switching power from such power source to the electrical load, and means responsive to said power switching means for generating such initiating signals.

17. In the circuit of claim 16, said control signal generating means generating a control signal comprising a direct current having a selected voltage amplitude.

18. In the circuit of claim 16 or claim 17, said light output pulse producing means comprising a voltage comparator for generating one of such output pulses whenever the amplitude of such control signal equals or exceeds the amplitude of a corresponding initiating signal.

19. In the circuit of claim 18, a light emitting diode energized by said voltage comparator.

20. In the circuit of claim 19, said means responsive to such pulses comprising a phototransistor optically coupled to said light output producing means.

21. In the circuit of claim 16 or claim 17, said power-switching means comprising a pair of silicon-controlled rectifiers each having an anode and a cathode, each of said rectifiers having a gate electrode controlled by said means responsive to such pulses.

22. In the circuit of claim 21, said means for generating initiating signals comprising a fixed reference voltage means and a light emitting diode that is energized whenever the potential at an anode of one of said rectifiers is greater than the potential at the anode of the other of said rectifiers, and a phototransistor optically coupled to said light output pulse producing means.

23. In the circuit of claim 21, said means responsive to such pulses comprising a phototransistor optically coupled to said light output producing means.

24. In the circuit of claim 23, said means for generating initiating signals comprising a fixed reference voltage means and a light emitting diode that is energized whenever the potential at an anode of one of said rectifiers is greater than the potential at the anode of the other of said rectifiers, and a phototransistor optically coupled to said light output pulse producing means.

* * * * *